United States Patent [19]

Arman

[11] 4,009,504

[45] Mar. 1, 1977

[54] SUPPORT OF THE WIPER BLADES IN THE WINDSHIELD WIPER INSTALLATIONS ON MOTOR VEHICLES IN GENERAL

[76] Inventor: Dario Arman, Via Venaria, 13/15, 10040 Druento, Torino, Italy

[22] Filed: Apr. 13, 1976

[21] Appl. No.: 676,629

[30] Foreign Application Priority Data

Apr. 15, 1975 Italy .................................. 67957/75

[52] U.S. Cl. ............................................ 15/250.42
[51] Int. Cl.² ......................................... B60S 1/04
[58] Field of Search .................. 15/250.32–250.42; 403/157, 159

[56] References Cited

UNITED STATES PATENTS

| 3,864,783 | 2/1975 | Arman | 15/250.42 |
| 3,879,792 | 4/1975 | Brummer et al. | 15/250.42 |
| 3,935,612 | 2/1976 | Wittwer | 15/250.42 |

FOREIGN PATENTS OR APPLICATIONS

| 1,183,446 | 3/1970 | United Kingdom | 15/250.42 |

*Primary Examiner*—Peter Feldman
*Attorney, Agent, or Firm*—Browdy and Neimark

[57] ABSTRACT

A support for the wiper blades of a windshield wiper installation on motor vehicles which includes a main rod whose ends are articulated to the top of a small bridge, the end of the rod being fork-shaped and provided with a pair of transverse opposed teeth projecting into the fork, the bridge being provided with two-sided cuts, and a saddle-shaped gasket mounted between the fork-shaped end of the rod and the back of the bridge.

2 Claims, 3 Drawing Figures

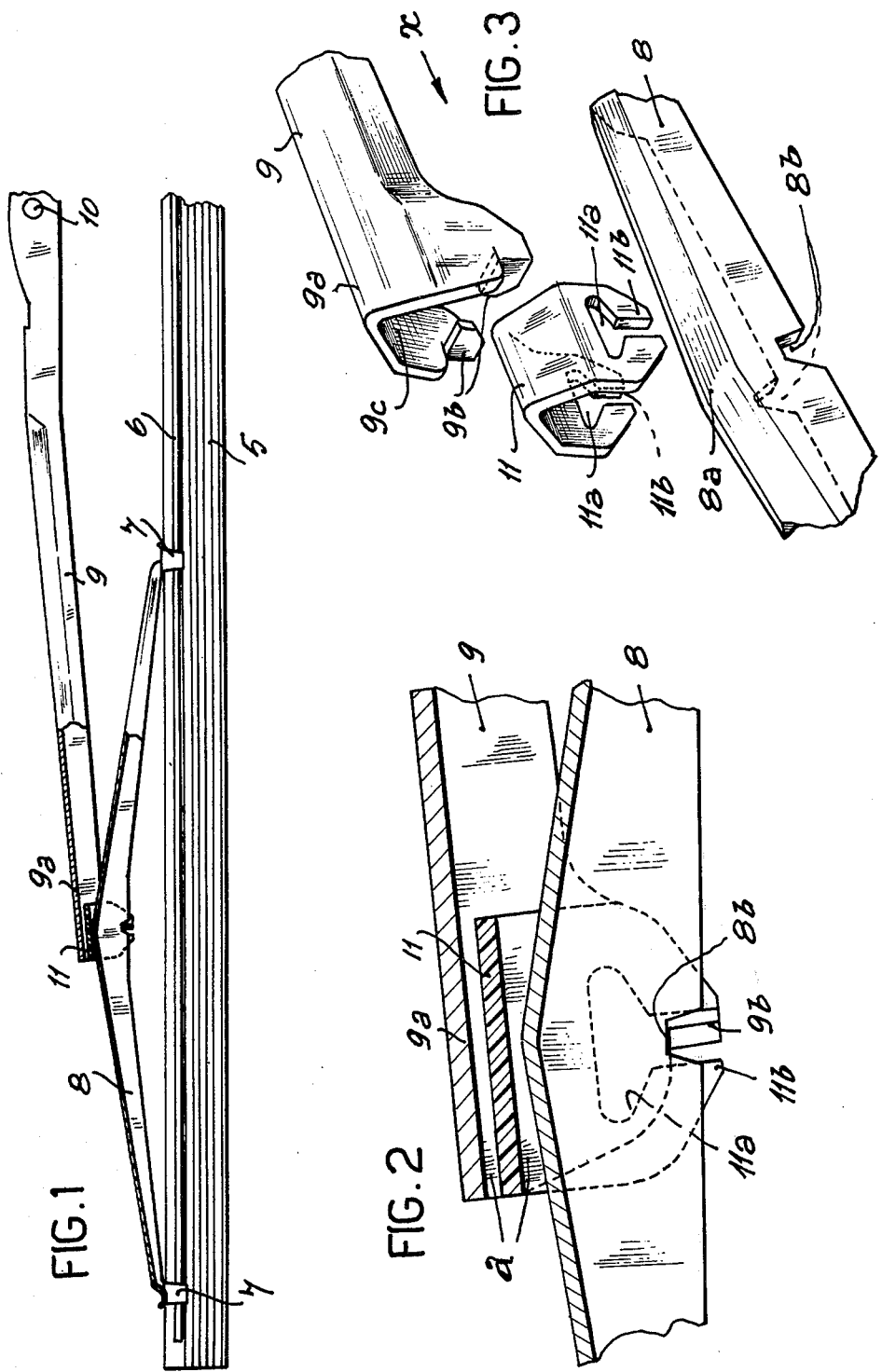

SUPPORT OF THE WIPER BLADES IN THE WINDSHIELD WIPER INSTALLATIONS ON MOTOR VEHICLES IN GENERAL

BACKGROUND OF THE INVENTION

In the windshield wiper installations on motor vehicles in general, the wipers mounted on the ends of the oscillable arms, comprise a wiper blade, generally made of rubber, engaged with a support including a main curved rod whose ends are articulated on the middle of a pair of small bridges which, with their ends form four engagement points for a lamina which carries the rubber wiper blade.

The known structure of the back supports for the wiper blades forms, thus, an assembly including at least three arcuated elements which are coplanar, superimposed and mutually articulated and being moderately elastically deformable under the load of the oscillable arm, for the purpose of a better adaptation of the wiper blade to the glass surface which is often curved with a non constant radius.

The articulations between the ends of said main rod, provided with the connecting member for the oscillable arm, and the central portion of the secondary small bridges, assume a remarkable importance because they must allow a certain amount of a relative movement, in the longitudinal direction, to the mutually articulated elements and, in the same time, they must possibly prevent any movement of said elements in the transverse direction; said articulations must further operate without evident clearance and noise.

Another feature required for said articulations is their effectiveness even if they are constantly exposed to the atmospheric agents, mud splashes and dust.

According to the present state of the technique these articulations are generally formed by transverse pins engaging the forked ends of the main rod with respect to the central point of the secondary small bridge back. In order to minimize the noise, plastic material inserts are frequently used which, if suitably shaped, avoid the direct contact between the surfaces, facing one another, of the articulated parts, when these are made of a metal. But this expedient does not eliminate the use of the transverse pins of the articulations and the possible oxidation and jamming of these pins with respect to the crossed metal parts.

SUMMARY OF THE INVENTION

With the object of eliminating the above drawbacks, the present invention has as its subject matter an improvement relating to the supports for the wiper blades, more particularly, to supports made of a metal main rod and metal secondary small bridges.

The improvement concerns, specifically, the structure of the articulations between the ends of the main rod and the secondary small bridges and is characterized in that each end of the main rod, which is fork-shaped, is provided with a pair of opposed retaining teeth, intended to engage corresponding slots formed in the sides of each small secondary bridge as well as corresponding slots formed in the sides of a plastic material gasket, which is saddle-shaped and interposed between the back of each small bridge and the corresponding forked end of the main rod.

BRIEF DESCRIPTION OF THE DRAWINGS

The features of the improvement according to the present invention will be clearer from the specification and the accompanying drawing, given for a demonstrative sake only, and wherein:

FIG. 1 represents in a side partial view a wiper with the improved articulation between a secondary small bridge and the main rod, longitudinally cutaway;

FIG. 2 is an enlarged vertical longitudinal cross sectional view of same articulation and;

FIG. 3 is a perspective exploded view of the parts forming each articulation.

As represented on the drawing, 5 indicates a wiper blade carried by the lamina 6 engaged on the sides by the ends 7 of the small bridge 8. At each small bridge 8, there is articulated at 8a, one of the ends 9a of the main rod 9 which carries at 10, through an articulation, the connecting element with respect to the end of the corresponding oscillable arm.

The main rod 9 or at least its ends 9a and each small bridge or at least its central part 8a, present a tile or substantially "U" shaped cross section. Each small bridge 8 presents on its sides, correspondently to the central part 8a, a pair of transversely aligned slot seats 8b.

Each end 9a of the main rod 9, is so outlined and bent as to present the pair of opposed teeth 9b. The cavity 9c of each fork 9a has such a size so that it may be easily mounted astride a gasket 11 which is molded of a plastic material and substantially saddle-shaped. The gasket 11 presents, in turn, such dimensions so that it may be mounted astride the central part 8a of each small bridge 8 and is provided with side seats 11a made as "T" shaped open slots.

The assembling of each articulation is effected as follows:

the fork 9a of the main rod 9 is inserted on end 7 of the small bridge 8, the two parts are then slided longitudinally relatively to one another until the slot seats 8b of bridge 8 become aligned with teeth 9b of the main rod 9. In this position, the bridge 8 may be engaged on teeth 9b by simply leaning it with its seats 8b on said teeth. In the remaining space, between the top 8a of the bridge 8 and cavity 9c of fork 9a, the plastic gasket 11 is inserted, initially placing it astride the bridge 8 to which it adheres with its sides and subsequently pushing it against teeth 9b until the elastic deformation of its edges 11b allows them to pass over teeth 9b and reach in the desired position represented on FIG. 2.

In these conditions, the articulation is formed without any transversal clearance between the parts and with a moderate clearance in -a- which is automatically taken-up under the thrust of the oscillable arm and by the reaction, in the vertical direction with respect to the glass, generated by said thrust.

Each articulation, so made is not spontaneously disconnectable because its disconnection requires the spreading of fork 9a or the extraction of teeth 9b by spreading edges 11b of seats 11a.

The saddle-shaped gasket 11, avoids the contact between the inner surface of fork 9a and the outer surface of bridge 8; the only limited contact surfaces of these two members are those of the upper edges of teeth 9b and of the bottom of seats 8b.

Substantially, the invention provides articulations having no transverse pins and which may be mounted by inserting teeth 9b in the seats 11a and 8b wherein the articulated parts are not subject to seizure caused by oxidation, and which produce no noise when the windshield wiper installation is actuated.

It is obvious that the improvement is not strictly limited to the embodiment described and represented but that without departing from the scope of the invention it may be modified particularly according to practical appliance requirements.

I claim:

1. A support for a wiper blade in a windshield wiper installation on motor vehicles comprising a support assembly formed by metal members having a traverse cross section substantially shaped like a U, comprising a main rod (9) whose ends (9a) are articulated to the central portions of small secondary bridges (8), wherein each end of said main rod (9) is defined by fork-shaped side walls (9a) and provided with a pair of transverse and opposed teeth (9b) thereon projecting within said fork; each small secondary bridge (8) is centrally provided with a cut (8b) on each side wall portion, each small secondary bridge carries astride at the central portion thereof a gasket (11) of plastic material which is substantially shaped like a U having side walls extending to substantially the height of the side walls of said small bridge; each side wall of said gasket is provided with an open side seat (11a); each end (9a) of said main rod is mounted astride said gasket (11) and is engaged with its teeth (9b) within the seats (11a) of said gasket (11) and within the cuts (8b) of the corresponding small bridge (8) in order to form articulated connections between the ends of the main rod (9) and the bridges (8).

2. A support according to claim 1, wherein said gasket (11) is provided with lateral cuts (11a) forming a slot with a "T" shaped outline.

* * * * *